US006868394B1

(12) United States Patent
Mele

(10) Patent No.: US 6,868,394 B1
(45) Date of Patent: Mar. 15, 2005

(54) METHOD AND APPARATUS FOR SIMPLIFIED ARTIST-BUYER TRANSACTIONS

(76) Inventor: Daniel Mele, 44 Tioga St., Buffalo, NY (US) 14216

( * ) Notice: Subject to any disclaimer, the term of this patent is extended or adjusted under 35 U.S.C. 154(b) by 853 days.

(21) Appl. No.: 09/665,862

(22) Filed: Sep. 20, 2000

Related U.S. Application Data

(60) Provisional application No. 60/155,070, filed on Sep. 21, 1999.

(51) Int. Cl.[7] ............................................. G06F 17/60
(52) U.S. Cl. ......................................... 705/26; 705/27
(58) Field of Search ..................................... 705/26, 27

(56) References Cited

U.S. PATENT DOCUMENTS 5,729,594 A * 3/1998 Klingman ................. 379/93.12
5,794,207 A * 8/1998 Walker et al. .................. 705/1
5,794,212 A * 8/1998 Mistr, Jr. ...................... 705/26

(List continued on next page.)

FOREIGN PATENT DOCUMENTS

JP 10-224549 A * 8/1998

OTHER PUBLICATIONS

Anon., "Online Shopping Comes to Bulletin Board Systems," Information and Interactive Services Report, vol. 16, No. 12, Jun. 16, 1995.*
Kuckro, R., "Fast Track to Online Profits," PC WOrld, vol. 13, No. 10, p. 271, Oct. 1995.*
Gates, D., "Cyberspace Superstore," Newsweek, vol. 127, No. 24, p. 86, Jun. 10, 1996.*
Karagiannis, D., "Two Large Sites," Popular Electronics, vol. 13, No. 7, p. 14, Jul. 1996.*
Dunlap, C., "Online Bookstores Suport Electronic Commerce," Computer Reseller News, N. 693, p. 53, Jul. 22, 1996.*
Tadjer, R., "Redefining 'Inventory'," Communications Week, No. 626, p. S13, Sep. 2, 1996.*
Barth, C., "International Bookstore Online," Orlando Business Journal, vol. 13, No. 20, p. 35, Oct. 18, 1996.*
Bubbeo, D., et al., "Cruisin' The Amazon," NetGuide, vol. 3, No. 12, p. 28, Dec. 1996.*
Anon., "Shopping," HomePC, vol. 3, No. 12, p. 195, Dec. 1996.*
Anon., "Surf Music" (abstract), Economist, The, (U.S. edition), Aug. 16, 1997, p. 47.*
J.M., "Testing the Web's Limits with Monet," Inc., vol. 20, No. 14, p. 19, Oct. 1998.*
Mires, C., "On–Line Shopping Is open Anytime," Philadelphia Inquirer, p. E01, Thursday, Dec. 15, 1988.*
Thilmany, J., "Fashionmall's Faster Fulfillment," WWD, p. 8, Dec. 23, 1998.*
Reidy, C., "Leveling the Field Small Retailers Rush to Web, Where They Can Compete with Big Boys," Boston Globe, Third Section: business, p. D1, Mar. 24, 1999.*

*Primary Examiner*—Nicholas D. Rosen
(74) *Attorney, Agent, or Firm*—Jaeckle Fleischman & Mugel, LLP

(57) ABSTRACT

A website on a computer server system contains (for browser access) a database of client recording artists, to each of whom is assigned an individual Web page 45b exhibiting musical works for sale. A shopper browsing the website may evaluate and initiate purchase of one or more recordings directly with the website. The website charges each client artist a portion of the price of each purchase made by a shopper. The website and its owners take payment, obtain shipping data from the buyer, deduct a website usage fee from the purchase price, and send the purchase order and the client artist's payment to the client artist or client artist's representative.

9 Claims, 8 Drawing Sheets

U.S. PATENT DOCUMENTS

| | | | | |
|---|---|---|---|---|
| 5,794,221 A | * | 8/1998 | Egendorf | 705/40 |
| 5,862,223 A | * | 1/1999 | Walker et al. | 705/50 |
| 5,895,454 A | * | 4/1999 | Harrington | 705/26 |
| 5,903,652 A | * | 5/1999 | Mital | 705/78 |
| 5,950,172 A | * | 9/1999 | Klingman | 705/26 |
| 5,950,173 A | * | 9/1999 | Perkowski | 705/26 |
| 5,966,697 A | * | 10/1999 | Fergerson et al. | 705/26 |
| 6,016,504 A | * | 1/2000 | Arnold et al. | 709/200 |
| 6,018,720 A | * | 1/2000 | Fujimoto | 705/26 |
| 6,029,141 A | * | 2/2000 | Bezos et al. | 705/27 |
| 6,070,160 A | * | 5/2000 | Geary | 707/4 |
| 6,121,530 A | * | 9/2000 | Sonoda | 84/609 |
| 6,170,017 B1 | * | 1/2001 | Dias et al. | 709/235 |
| 6,233,682 B1 | * | 5/2001 | Fritsch | 713/168 |
| 6,249,772 B1 | * | 6/2001 | Walker et al. | 705/26 |
| 6,370,514 B1 | * | 4/2002 | Messner | 705/14 |
| 6,490,602 B1 | * | 12/2002 | Kraemer | 715/513 |
| 6,629,079 B1 | * | 9/2003 | Spiegel et al. | 705/26 |
| 2001/0016828 A1 | * | 8/2001 | Philippe et al. | 705/26 |
| 2002/0059114 A1 | * | 5/2002 | Cockrill et al. | 705/27 |
| 2002/0178071 A1 | * | 11/2002 | Walker et al. | 705/26 |

* cited by examiner

METHOD AND APPARATUS FOR SIMPLIFIED ARTIST-BUYER TRANSACTIONS

CROSS-REFERENCE TO RELATED APPLICATION

This application claims the benefit of U.S. Provisional Patent Application Ser. No. 60/155,070, filed Sep. 21, 1999.

FIELD OF INVENTION

This invention relates to Internet-based business methods and systems, and more specifically to business systems for Websites marketing the works of many artists to shoppers on the World Wide Web.

DEFINITIONS

By "artist" or "recording artist" is meant in the specific sense a musician or band of musicians producing recorded music for sale, and in the general sense any artist producing works of art which can be represented for sale on the World Wide Web.

By "the website" is meant here a single Web site providing a single point of access to many artists from Web shoppers.

By "client artist" or "client recording artist" is meant here an artist who has registered and contracted with a website to provide shopper access to the artist's works via the website.

By "recording" is meant here a recorded collection of songs or musical compositions normally packaged and sold as a unit (e.g., a CD).

By "audio file" or "sound file" is meant here a computer-stored digital representation of one or more sound waves.

By "file player type" is meant here one of several available software programs capable of playing back an audio file which has been stored in a specific format. Examples are RealAudio and MP3 formats and player programs.

DISCUSSION OF PRIOR ART

Firms doing business on the World Wide Web have a bewildering array of choices of methods by which to engage in trade. Business on the Internet is in a state of explosive ferment, with new kinds of 'stores' and 'malls' coming into existence continually. Since creating a commercial establishment on the World Wide Web is so easy, thousands of small firms have chosen to do business in a way that takes advantage of the world-wide market while still using the same basic business approach that is found in ordinary physical stores. Essentially, a Web business selling physical goods simply obtains a buyer's credit card information over the Web and ships goods to the buyer. The shipment may come from any part of the world to the Web business, and be sent to any other part of the world from the Web business.

What is common to businesses operating in this manner is the fact that they maintain an inventory of goods from their suppliers in order to fill orders in a timely fashion. The maintenance of inventory is costly and wasteful. Bulk shipments of goods must travel from the suppliers to a storage site for the Web business, and must then be shipped piecemeal to each buyer. Goods not sold must be dealt with by the Web business and the supplier. The Web business must provide resources and funds to provide for supplier shipping, returns, storage, and management. Understocked goods result in loss of business to other firms.

From the point of view of the supplier, the process also wastes resources and money. If the supplier commits goods to one business which is not selling them, and another one needs them for sale, the supplier cannot recall the committed goods without effort, delay and expense. The opportunity for selling goods may well vanish before such an adjustment can be made. This is especially true in the high-speed, highly-competitive world of Web commerce.

Also from the supplier's viewpoint, negotiation of terms under which a Web business will carry goods can result in high initial costs. To recoup its own inventory management costs and make a profit, a business selling goods from a supplier may charge a high initial fee to the supplier for carrying them, or may take a high percentage of the price of the goods in markup. Such arrangements make the supplier's goods less attractive to buyers in the marketplace, and are potentially costly to the supplier even in the absence of sales.

SUMMARY

The invention comprises a website containing (for browser access) a database of recording artists, to each of whom is assigned an individual Web page image, information a shopper may use to arrange purchase of recordings, a set of recording samples for each recording to be sold, and a title of each musical piece on each recording. A shopper browsing the website may select a recording artist, listen to one or more recording samples made by that artist, and initiate purchase of one or more recordings directly with the website. The website charges each artist a portion of the price of each purchase made by a shopper. The website and its owners accept and validate buyer credit card information, obtain shipping data from the buyer, deduct a website usage fee from the purchase price, and send the purchase order and the artist's payment to the artist or artist's representative. The artist or representative then fulfills the order directly to the customer. The advantage to the shopper is fast, low-cost access to music by artists not otherwise able to market and distribute their works as widely as the World Wide Web allows. The advantages to the artist are a low-cost channel for distribution, global public exposure of the artist's works, and a significantly-larger profit per recording sold as compared with currently-prevailing methods of doing business. The advantage to the Website is a very-low-overhead, large-scale marketing operation which increases proportionately in its profit as the volume of sales of supported artists increases. An alternative approach differs from the one described above in that the artist pays the website a fee for its service and handles all purchase transactions and shipments directly with the shopper. A third approach combines features of the first two. The same process described for musical artists and works may be used for other forms of works of art which can be analogously represented by samples on the World Wide Web for shopper evaluation.

DESCRIPTION OF DRAWINGS

FIG. 2 shows the artist registration process via the website.

FIG. 3 shows the process of transfer of music information from the artist to the website staff, and the placement of recording information, including samples for playback, on the website.

FIG. 4 shows the process of creation of a shopper order.

FIG. 5 shows the processing of a shopper order through the website to the artist.

FIG. 6 shows the shipment of a recording to a shopper from the artist.

FIG. 7 shows a summary of the series of steps during ordering and fulfillment.

DETAILED DESCRIPTION OF INVENTION

For illustration, this description specifies the artists as musicians, and their works of art as recordings. This specification is not intended to restrict the scope of this invention to such artists and works.

Figure 1:
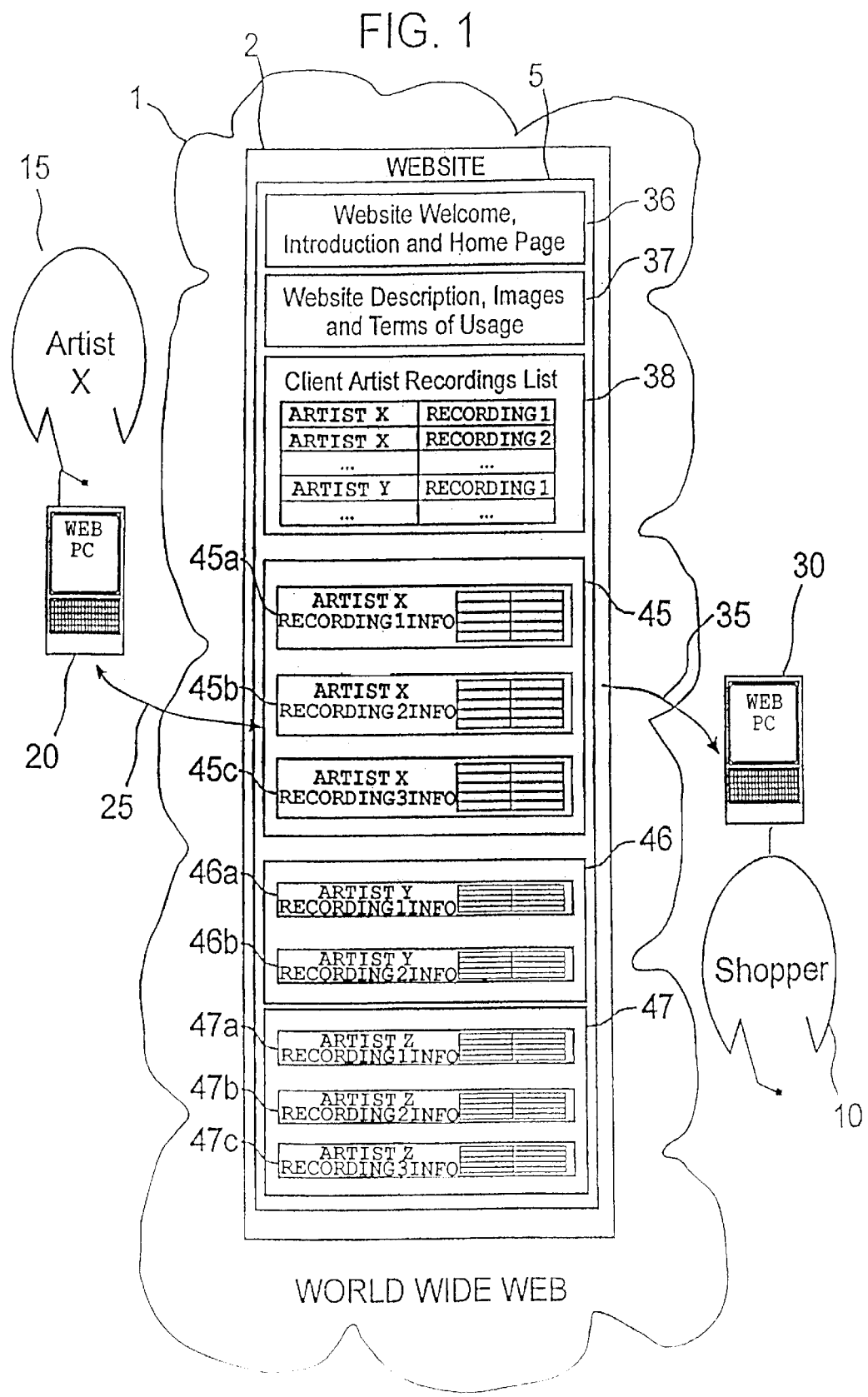
FIG. 1 shows the overview of the proposed invention, including the invention's website, the access to that website by Web shoppers, and the access to that website by the client artists.

For a general overview of the components and interconnections of the invention, refer to FIG. 1. The invention includes a website 5. Website 5 is stored in one or more server computer systems 2. Each server system 2 is made up of one or more interconnected processors, each with its associated main memory and disk storage subsystem. Each server system 2 is connected to the World Wide Web 1 via one or more high-speed links. Each server system 2 operates programs in support of website 5, as described below. A server system 2 may store and support operation of multiple websites not all of which are related to the present invention.

Website 5 is made up of a set of Web pages and a database containing any data accumulated through the use of these Web pages, such as orders for recordings and statistics gathered from shoppers accessing the Web pages. The database (not shown) is stored on one or more disk storage systems in a manner well known to those skilled in the art. Website 5 also provides for operation of commonly-used server programs that present the Web pages to shoppers and artists accessing website 5. These Web page server programs mediate shopping and artist registration. Website 5 further provides for operation of commonly-used server programs that manage the accumulated data in the database. These database server programs store, retrieve, update and administer the order data, artist registration data, and webpage access statistical data. Website 5 still further provides for operation of commonly-used communication programs that exchange electronic mail with mail addresses on the World Wide Web, such as the mail addresses for shoppers and client artists. Electronic mail is used for sending orders to client artists, and for general communications between the website and both shoppers and client artists.

The World Wide Web makes website 5 accessible to both client recording artists and shoppers anywhere a Web connection is available, using a commonly-used Web browser program, such as Microsoft Explorer or Netscape, that supports the use of secure forms. Secure forms provide for the safely-encrypted transfer of personal confidential financial information such as credit card numbers. For purposes of registration and verification of website content, client recording artist 15 uses a computer system 20 equipped with a standard Web browser to visit website 5 over Internet access pathway 25. Computer system 20 may be any desktop, laptop, handheld, or telecommunications device that supports Web browsing, playback of audio files to the client artist, and provision of user-supplied data to a website via the website's online forms. Access pathway 25 connects client artist 15 to the World Wide Web 1. Access pathway 25 may be a wireless or landline telephone connection, cable modem connection, or any other link that supports the browser, playback and forms-management functions of computer system 20.

In a similar manner, a shopper 10 seeking to listen to recording samples and buy recordings uses a computer system 30 equipped with a commonly-used Web browser to visit website 5 over Internet access pathway 35. Just as for computer system 20, computer system 30 may be any desktop, laptop, handheld, or telecommunications device that supports Web browsing, playback of audio files to the client artist, and provision of user-supplied data to a website via the website's online forms. Again, as for a client artist, access pathway 35 connects shopper 10 to the World Wide Web 1. Likewise, access pathway 35 may be a wireless or landline telephone connection, cable modem connection, or any other link that supports the browser, audio playback, and forms-management functions of computer system 30.

An artist wishing to use the invention must register with the website, supply the website with samples of music, and accept shipment orders from the website. Registration is conveyed through the use of an online form provided by website 5 to artist 15. The artist registration form requests the artist's name, title of recording, number of copies the artist has on hand, the type of music, contact information to reach the artist or artist's representative, and the artist's agreement to the terms of the registration. The artist supplies samples of music to the website by furnishing the website with a copy of the recording to be sold, along with biographical and other background data. The furnishing of samples and biographical data may be done either by mail or electronically over the World Wide Web.

Figure 1A:
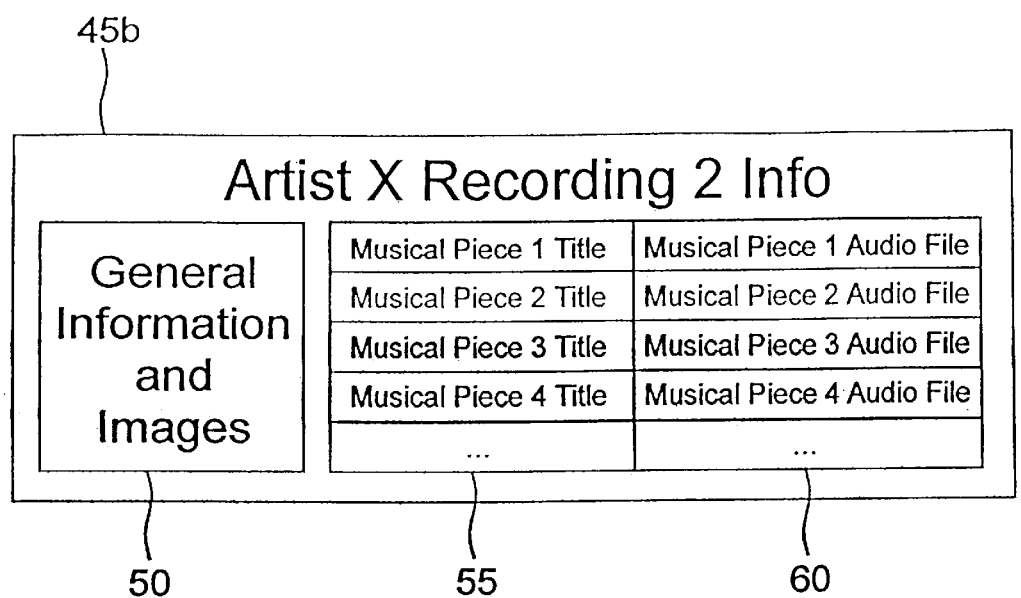
FIG. 1a shows a set of information elements maintained for each artist recording.

The Web pages of website 5 include the following. First, an introductory set of Web pages 36 welcoming a visitor to website 5, offering choices of pages to retrieve for both artists and shoppers, and describing website 5 and its terms of usage for both client artists 15 and shoppers 10. To help shoppers find artists and recordings, website 5 also includes a list 38 of recordings of client artists, with each recording of each client artist listed by its title and the particular type of music in which the client artist wishes it classified. For a client artist 15, website 5 includes a Web page for each recording supplied by client artist 15, making up a set 45 of such recording Web pages. FIG. 1 shows three such Web pages 45a, 45b, 45c for client artist 15. As shown in FIG. 1a, one such Web page 45b provides general information 50 for a corresponding recording, a list 55 of titles of musical pieces on the recording, and a set 60 of audio files, up to one per file player type per musical piece on the recording as decided by the client artist. For each recording, general information 50 includes an image selected by the client artist and background information concerning the client artist and the recording. For each title of a musical piece chosen by the client artist, one or more audio files is stored for playback by shoppers 10. The display for list 38 incorporates a link to the display for each recording by each artist, so that a shopper using a browser may display a recording Web page by clicking on its corresponding list entry.

Other artists have their own sets of Web pages 46, 47 for their recordings. Customized information besides that described above may be incorporated in any artist's set of Web pages.

Operation of the Invention

For illustration, this description of the invention's operation specifies the client artists as musicians, and their works of art as recordings. This specification is not intended to restrict the scope of this invention to such client artists and works.

In general, an individual computer user on a Web-connected computer can change from one Web page display to another by using a browser program in the following manner: the user positions the computer's mouse pointer over a button or other specially-marked area of the screen display and clicks the left mouse button. The click over the specially-marked area causes the browser program to correlate the position of the mouse pointer with a program component or Web page name associated with that area. The browser program then either executes the associated program component or retrieves the associated Web page and displays it on the user's screen. By the use of the term "select" here is meant selecting a Web page display or a browser action by clicking the left mouse button on a marked screen location while the browser program is in control.

Figure 2:
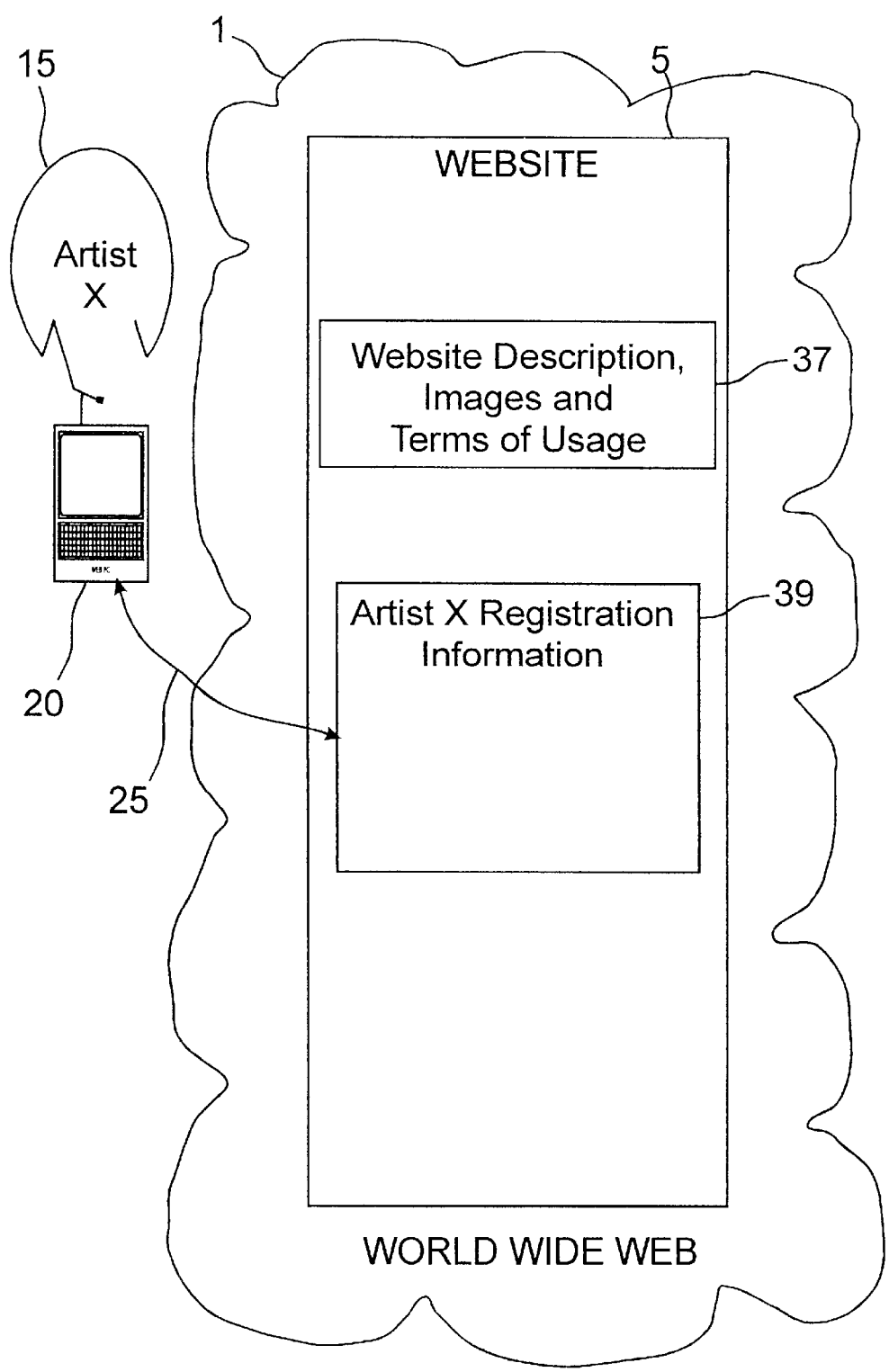
FIGS. 2 and 3 show the series of stages of artist registration to use the invention.

Refer now to FIG. 2. Before a shopper can find and purchase a desired recording, the artist who has produced that recording must make the recording available for evaluation on the website. To do this, the artist must first register with the website, thereby becoming a client artist. In the process of registration, a client artist 15 registers with website 5 via Web access pathway 25, filling out an online form as in common practice to supply registration information 39 which includes the artist's name, title of recording, number of copies the artist has on hand, the type of music, contact information to reach the artist or artist's representative, and the artist's agreement to the terms of the registration.

Figure 3:
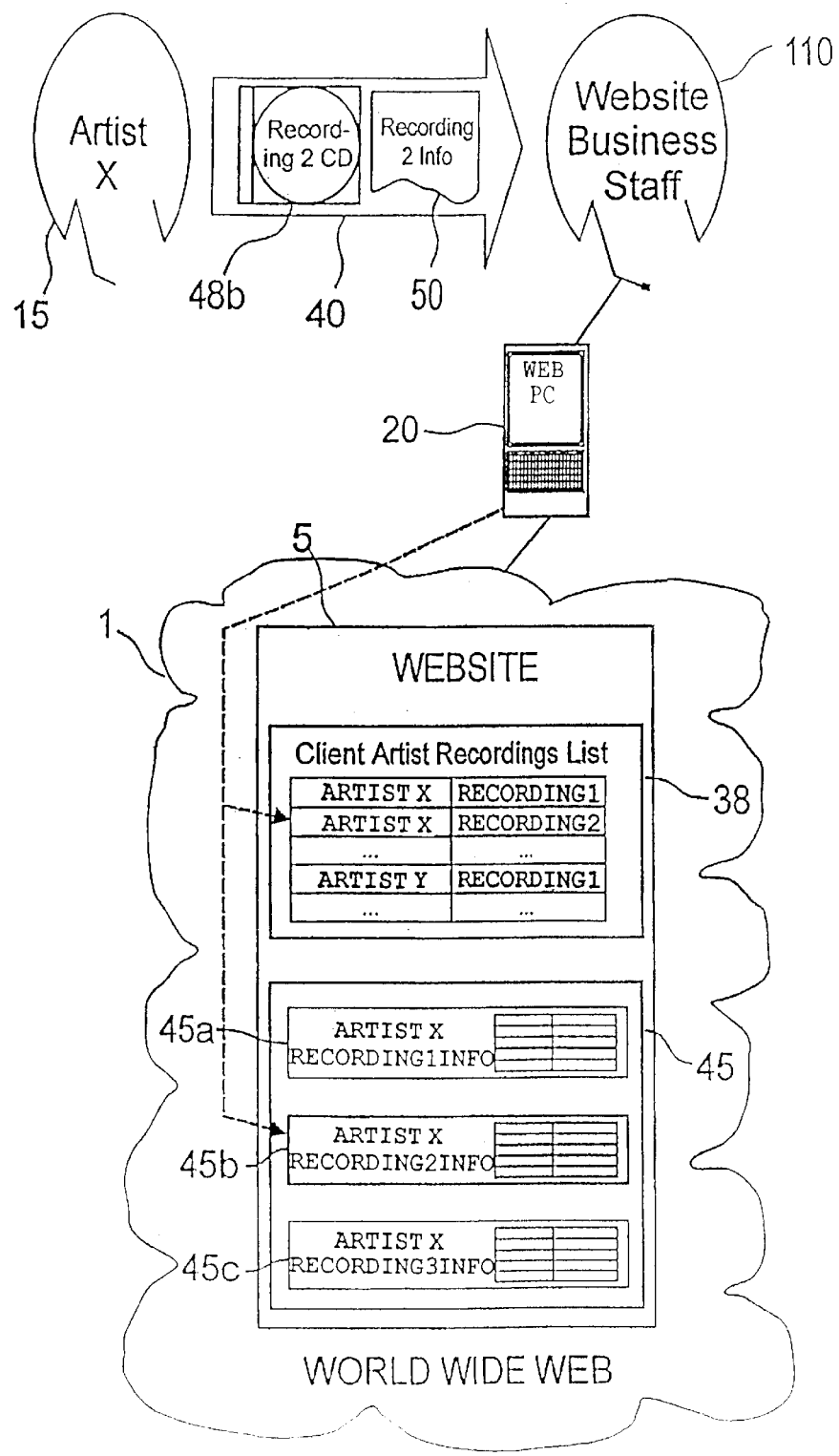

As shown in FIG. 3, client artist 15 then supplies to website 5 a set of information 40 necessary for presentation and sale of a specific recording 48b by client artist 15. Information 40 includes images and background information 50 concerning client artist 15 and the client artist's recording 48b, titles 55 of all musical pieces on recording 48b, and, optionally, playable audio files 60 for all musical pieces on recording 48b which the client artist wishes to share with shoppers before sale. Supplying this information may be accomplished either via a physical mailing process to website business staff 110 or via Web access pathway 25. Using the information supplied by client artist 15, website business staff 110 create Web page 45b for recording 48b of client artist 15, and add recording 48b to list 38 of the recordings available for purchase. Web page 45b displays images and background information 50, titles 55, and sound files 60 for all the musical pieces on recording 48b that client artist 15 wishes to share with shoppers before sale. Website business staff 110 then bring Web page 45b online for Web access by shoppers. At this point the client artist's recording 48b is ready for presentation to shoppers.

Figure 4:
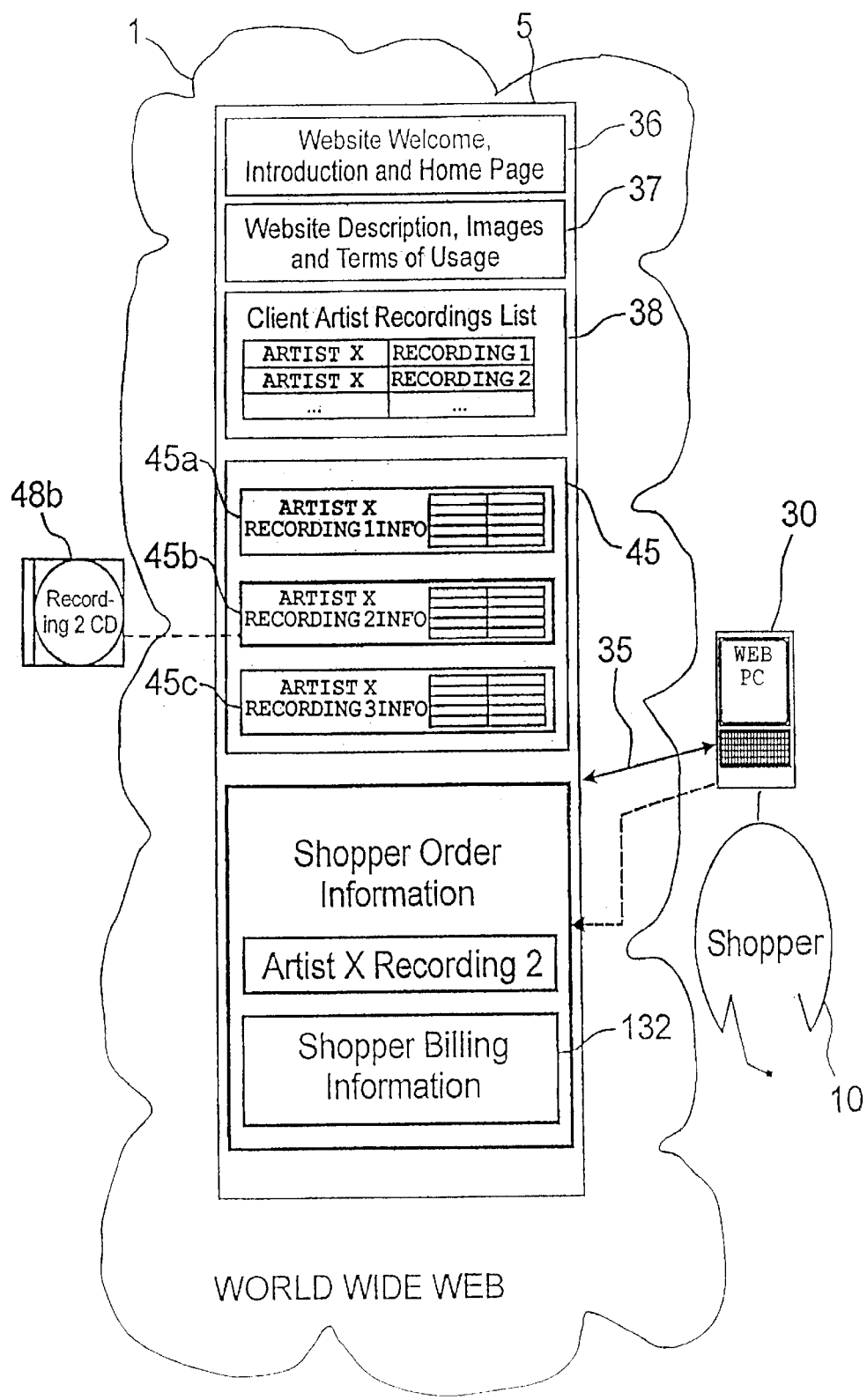
FIGS. 4 through 7 show the series of stages of an order for a recording.

The shopping process works as shown in FIG. 4. A shopper 10 using computer system 30 connects to website 5 over the World Wide Web 1 using access pathway 35. Shopper 10 browses through list 38 of client artists and recordings, and selects a recording 48b made by client artist 15. Selection of recording 48b causes Web page 45b to be displayed. The shopper then browses through the list 55 of musical pieces on that recording. On finding a musical piece of interest, the shopper selects the audio file for that piece, and plays it back using an audio player available to the browser program. The audio player must be able to reproduce sounds accurately from one of several digital file forms, among them RealAudio and MP3. The shopper may select and play back any number of audio files one by one. The shopper may repeat this process until either leaving Web page 45b or deciding to order recording 48b. Recording 48b is shown here as selected purely for purposes of illustration.

The ordering process operates as follows. Continuing with FIG. 4, shopper 10 orders a recording 48b by selecting a button displayed on Web page 45b for requesting an order form. This selection causes the browser to display the order form with recording 48b already entered. Shopper 10 fills in requested billing information 132, and submits the completed form to website 5.

Figure 5:
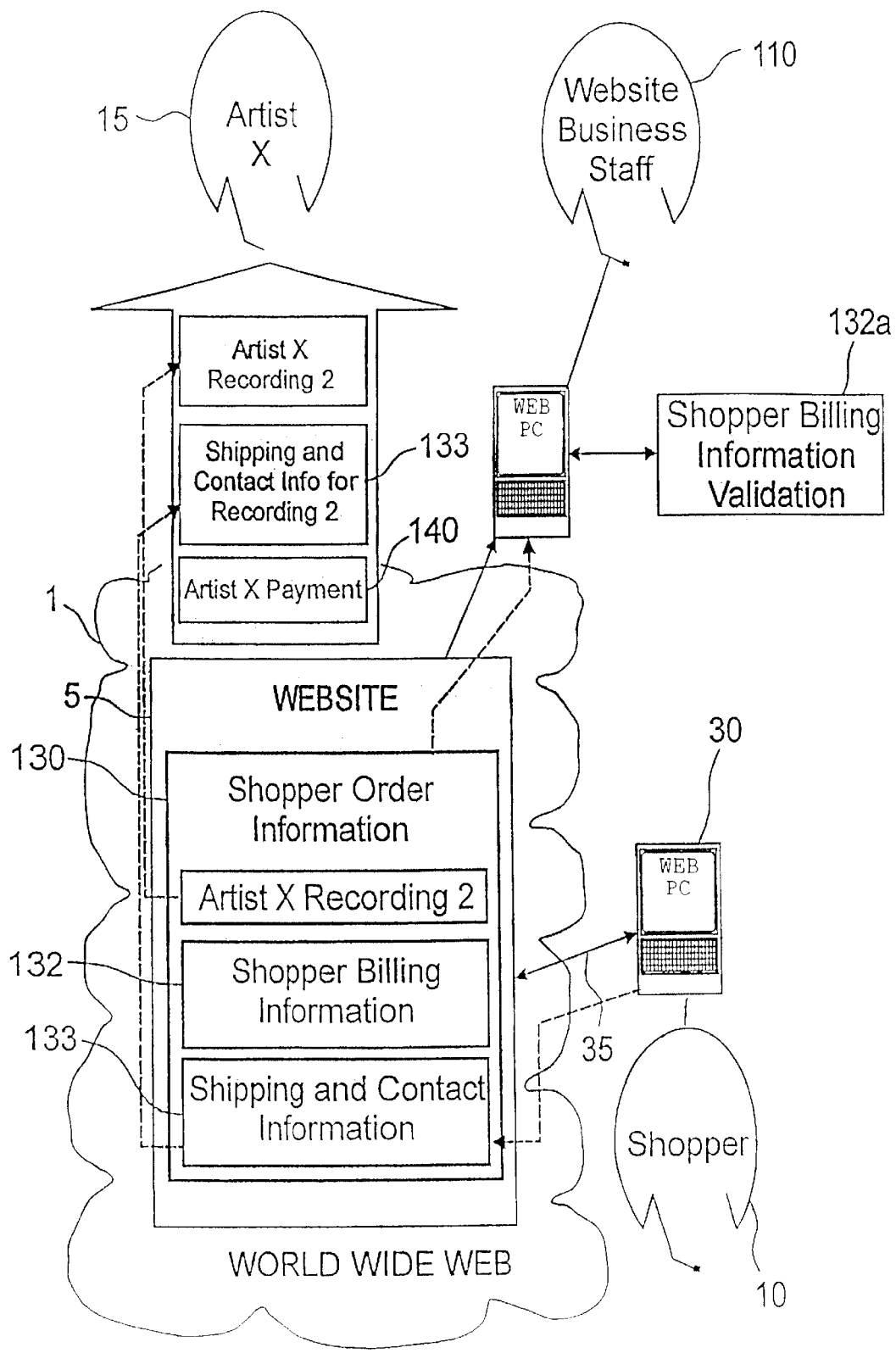

Continuing with FIG. 5, website 5 stores billing information 132, and sends a validation and billing request 132a to the institution handling the billing for shopper 10. If the validation and billing request 132a is accepted, website 5 displays to the shopper a second form requesting shipping and contact information 133 for the shopper. Shopper 10 fills in shipping and contact information 133, and submits the form to website 5, completing order 130. Website 5 then deducts from the recording's sale price the fee website 5 charges for sale of each recording, prepares a payment 140 for client artist 15. Next, Website 5 mails shipping and shopper contact information 133 electronically to client artist 15, sends payment 140 to client artist 15, and stores a copy of order information 130 in its own database. Sending order 130 and payment 140 to the artist eliminates any requirement for website 5 itself to maintain inventory of the works which might be ordered by shoppers.

Figure 6:
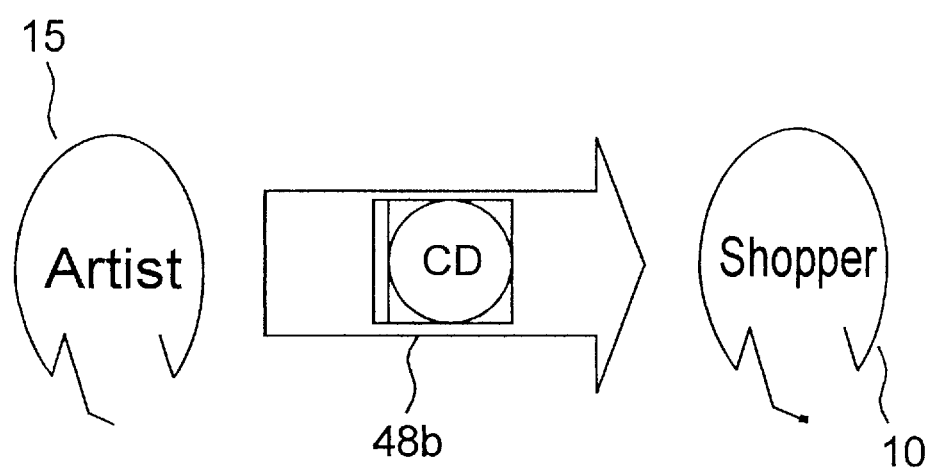
Figure 7:
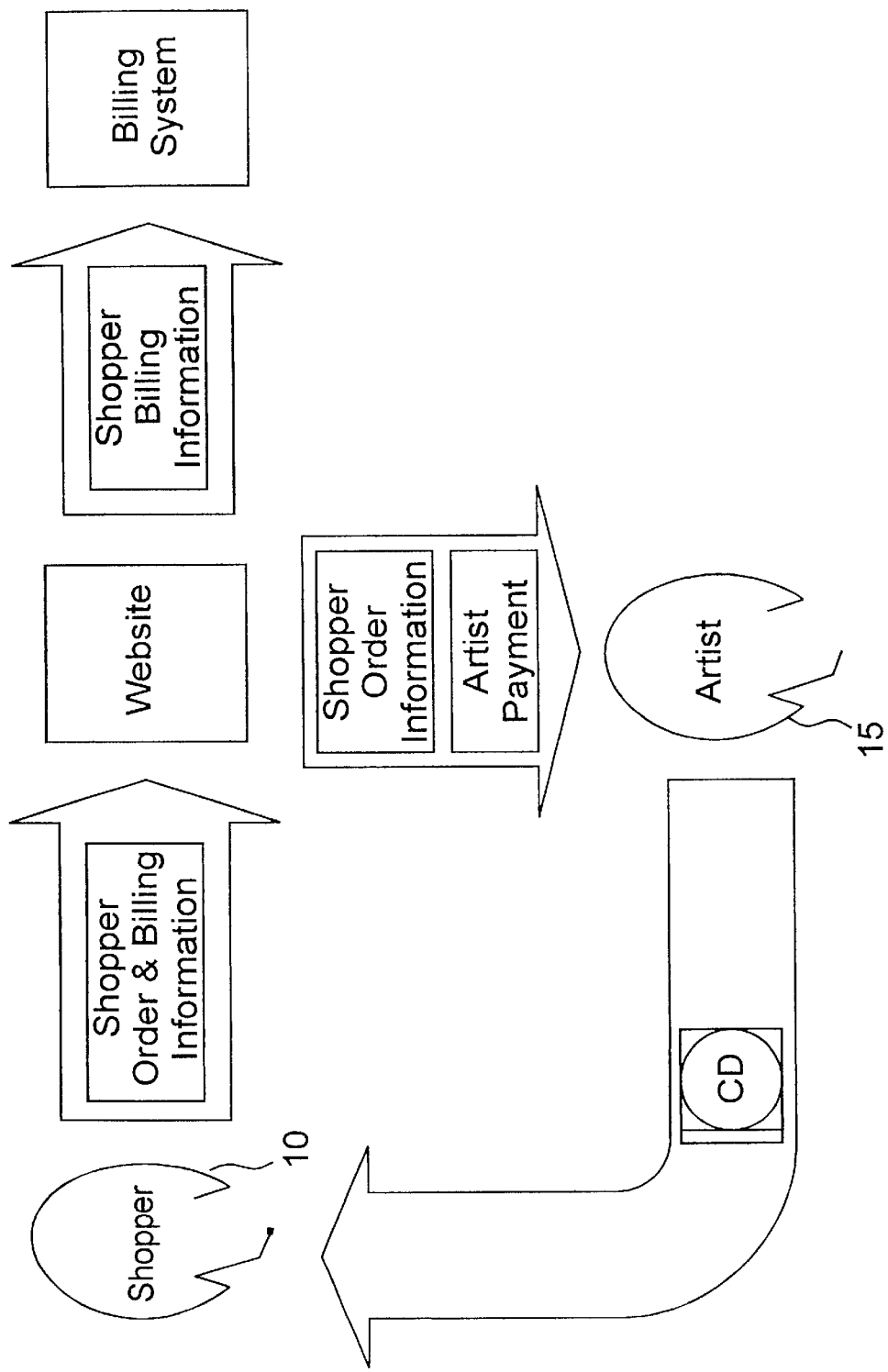

FIG. 6 shows that on receipt of online order and payment, client artist 15 fulfills an online order by sending recording 48b directly to shopper 10. Website 5 is not involved in the shipment process at all. FIG. 7 shows a sketch of the overall flow of order data and orders.

In a second embodiment, a client artist 15 registers with website 5, pays a required advance service fee to website 5, and supplies to website 5 images and background information 40, recordings 48, song lists 55, optionally sound files 60 for all songs the client artist wishes to share with shoppers before sale, and contact information to allow a shopper to contact the client artist directly. The shopper may, on finding a satisfactory recording, use the client artist's contact information on website 5 to reach the client artist and arrange purchase of a recording 45 independently. In this embodiment, Website 5 takes no fee for the sale of each recording. In this embodiment, website 5 may also support a client artist by furnishing shoppers with World Wide Web links to another website maintained by the client artist, by furnishing shoppers with an electronic mail address for the client artist, or by providing other usable contact information for the client artist.

In a third embodiment, a client artist registers with website 5, pays a required advance service fee to website 5, and supplies to website 5 images and background information 40, recordings 48, song lists 55, optionally sound files 60 for all songs the client artist wishes to share with shoppers before sale, and contact information to allow a shopper to contact the client artist directly. This stage of operation is the same as for the second embodiment. In this third embodiment, however, the shopper renders payment to website 5 at the time of the order, and the order is then processed as described for the first embodiment. This third embodiment combines features of the first two.

It should be evident for all embodiments that the elimination of inventory maintenance, shipping and receiving from website 5 makes Website operation inexpensive, simple and quick. The present invention's approach facilitates direct shopper-artist business without adding significant distribution and marketing overhead. In addition, the use of the invention frees the artist from costly promotional programs, and supports the website while placing the major part of the profit from sale directly in the artist's hands.

The delivery of the order to a shopper need not be done using separate recording media such as compact disks, cassette tapes, or other forms that require mailing or shipping. Delivery may be accomplished directly over the world Wide Web through a file transfer process. In this form of the invention the client artist, on receiving payment, makes available to the purchasing shopper a file containing the musical pieces making up the recording purchased. The purchasing shopper then transfers this file from the client artist's site to the shopper's system using a commonly-accepted file transfer protocol.

The use of recorded music in the description of the invention given above, and in the associated figures, is purely illustrative. The invention's arrangement and treatment of client artist, website and shopper applies equally well to works other than music which are capable of sample representation on a website. Examples of such works other than music include literary works, works of art, and works of a programmatic nature such as games played using a computer. In each case the client artist creates the work not in music but in the medium appropriate to the type of work, and provides samples to the website. An appropriate mechanism of presentation must be available on the Web for shoppers to use to view, listen to, or otherwise evaluate each type of sample of work. As examples, for audio files, an audio file player is necessary, for visual images a high-resolution viewer is required, and for written works a compatible viewing program must be used. Such sample representation on a website must be such as will satisfy a shopper as to the quality and character of the works represented, while leaving the distribution to shoppers of such works in the hands of the client artist.

What is claimed is:

1. An apparatus for arranging and conducting simplified business transactions between creators of works of art, hereinafter called client artists, and shoppers for such works of art, comprising:
    a server computer system including one or more processors, one or more main memory subsystems, one or more storage subsystems, and one more connections to the World Wide Web;
    a website stored in and executing in said server computer system, said website including
    one or more online forms for registering and for presenting works of art produced by one or more client artists;
    one or more online order forms for evaluating and purchasing one or more works of art of any of said client artists by a purchaser;
    an online World Wide Web connection to each of said client artists for the forwarding purchase order information to the client artist;
    a collection of web pages for each of said client artists, each such client artist web page in a form suitable for computer storage and retrieval via the World Wide Web, each such client artist web page in turn comprising background information concerning the client artist and the client artist's works of art, a plurality of samples of the client artist's works of art available for sale, and a description of each sample and the work it represents;
    means for receiving purchase information from a purchaser for ordering a work of art;
    means for validating the purchaser's billing information for the order;
    means for submitting a bill for the order to an account of the purchaser's;
    means for deducting from a sale price of the work of art a website fee for each sale completed;
    means for sending purchase order information to the client artists, whereby any client artist may fulfill orders quickly and directly to shoppers and whereby inventory of works of art controlled by the website is minimized; and
    means for conveying payment for the ordered work of art to the client artist who presents said ordered work of art for sale.

2. The apparatus of claim 1 wherein each client artist is a musician.

3. The apparatus of claim 1 wherein each client artist is a musical group.

4. The apparatus of claim 1 wherein each work of art comprises one or more musical pieces.

5. The apparatus of claim 1 wherein each of said plurality of samples of the client artist's works of art available for sale is a sound sample of a specific musical piece.

6. A method for arranging and conducting simplified business transactions between creators of works of art and shoppers for such works of art, comprising the steps of:
    registering one or more client artists with a website via World Wide Web access using an online form;
    acquiring from each client artist one or more images and background information concerning the client artist and the client artist's works of art, and a sample of each work of art the client artist wishes to share with shoppers before sale;
    displaying images, background information concerning the client artist and the client artist's works of art, and a sample of the work of art for all works each client artist wishes to share with shoppers before sale, for each such work of art for each client artist, creating a webpage;
    bringing all said webpages online on the website for World Wide Web access by shoppers;
    at a shopper's request for a sample presentation, offering the requested sample to the shopper via the World Wide Web for shopper evaluation;
    at a shopper's request for purchase of a work of art by a client artist, presenting the shopper with an online order form from the website;
    taking the shopper's order, shipping and billing information from the online order form to produce an order;
    validating shopper billing information for the order;
    submitting a bill for the order to the shopper's account;
    deducting from the sale price of the work of art a website fee for each sale completed;
    preparing an order to the client artist for the ordered work, said order comprising the identity of the work of art and the address to which it is to be sent;
    conveying to the client artist the order and the client artist's payment for the ordered work of art,
    whereby the client artist fulfills the order directly with the shopper, and
    whereby the website shipment and maintenance of inventory of works of art is eliminated.

7. The method of claim 6 whereby offering a sample presentation comprises playing back an audio file.

8. A method for arranging and conducting simplified business transactions between creators of works of art and shoppers for such works of art, comprising the steps of:
    registering one or more client artists with a website via World Wide Web access using an online form;
    obtaining from each client artist an advance payment of a website usage fee;

acquiring from each client artist one or more images and background information concerning the client artist and the client artist's works of art, and a sample of each work of art the client artist wishes to share with shoppers before sale;

for all works each client artist wishes to share with shoppers before sale, for each such work of art for each client artist, creating a webpage displaying images, background information, and a sample of the work of art;

bringing all said webpages online on the website for World Wide Web access by shoppers;

at a shopper's request for a sample presentation, presenting the requested sample of a work of art via the World Wide Web for shopper evaluation;

at a shopper's request for purchase of a work of art by a client artist, presenting the shopper with an online order form from the website;

taking the shopper's order, shipping and billing information from the online order form to produce an order;

validating shopper billing information for the order;

submitting a bill for the order to the shopper's account;

deducting from the sale price of the work of art a website fee for each sale completed;

preparing an order to the client artist for the ordered work, said order comprising the identity of the work of art and the address to which it is to be sent;

conveying to the client artist the order and the client artist's payment for the ordered work of art, whereby the client artist fulfills the order directly with the shopper, and whereby the website shipment and maintenance of inventory of works of art is eliminated.

9. The method of claim 8 whereby offering a sample presentation comprises playing an audio file.

* * * * *